Sept. 17, 1963     C. H. MUELLER     3,103,947

DRAIN ATTACHMENT

Filed Sept. 13, 1961

Carl H. Mueller,
Inventor.
Koenig, Pope, Senniger and Powers,
Attorneys.

United States Patent Office 3,103,947
Patented Sept. 17, 1963

3,103,947
DRAIN ATTACHMENT
Carl H. Mueller, Pasadena Hills, Mo., assignor to The McNeil Machine & Engineering Company, Akron, Ohio, a corporation of Ohio
Filed Sept. 13, 1961, Ser. No. 137,870
7 Claims. (Cl. 137—351)

This invention relates to a drain attachment, and more particularly to a drain attachment for connection into the crankcase of an automotive engine to facilitate rapid draining of oil from the crankcase by pumping.

Among the several objects of the invention may be noted the provision of a drain attachment of the class adapted for connection into a crankcase replacing the usual crankcase drain plug, and including a flexible drain hose adapted for connection thereto of a suction hose extending from the inlet of a drain pump for pumping oil from the crankcase, the drain hose being adapted to be swivelled to various positions for convenience in carrying out the drainage operation, and the attachment including a check valve which is normally closed to prevent loss of oil from the crankcase and adapted to open under suction of the pump for drainage; and the provision of an attachment such as described which is economical to manufacture, and reliable in use. Other objects and features will be in part apparent and in part pointed out hereinafter.

The invention accordingly comprises the construction hereinafter described, the scope of the invention being indicated in the following claims.

Figure 1:
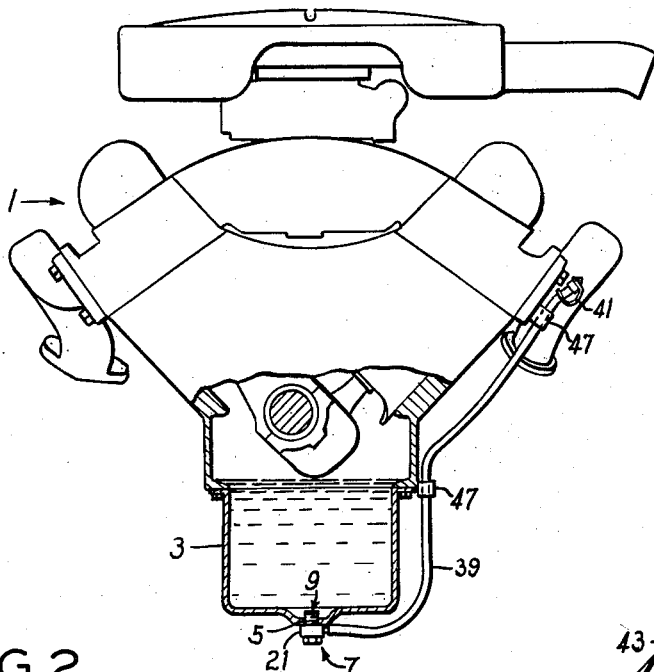
Figure 2:
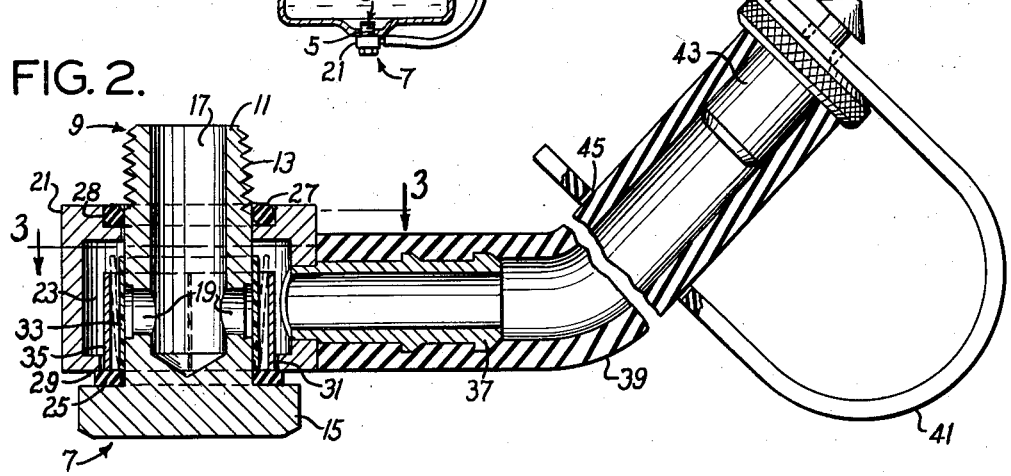
Figure 3:
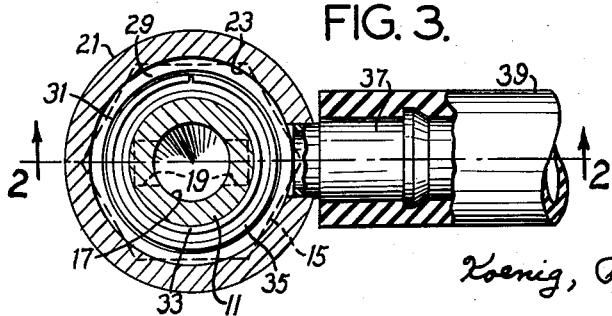

In the accompanying drawings, in which one of various possible embodiments of the invention is illustrated, FIG. 1 is an end elevation, with parts broken away and shown in section, of an automotive engine equipped with a drain attachment of this invention;

FIG. 2 is an enlarged cross section of the attachment taken on line 2—2 of FIG. 3; and FIG. 3 is a section taken on line 3—3 of FIG. 2.

Corresponding reference characters indicate corresponding parts through the several views of the drawings.

Referring to FIG. 1 of the drawings, there is indicated at 1 a conventional automotive engine having a crankcase 3. At 5 is indicated the usual tapped drain hole for the crankcase. This is conventionally closed by a plug threaded therein, this plug being unscrewed when it is desired to drain oil from the crankcase. FIG. 1 shows the usual drain plug removed, and a drain attachment 7 of this invention connected into the crankcase replacing the usual drain plug.

As shown in FIGS. 1–3, attachment 7 includes a fitting 9 consisting of a cylindrical stem 11 having an external screw thread 13 at one end (its inner end) and a hexagonal head 15 at its other end (its outer end). The stem 11 has an axial bore or passage 17 extending outwardly from its inner end and terminating short of the outer end of the fitting. Radial ports 19 are provided in the stem extending outwardly from passage 17 intermediate the inner end of the screw thread 13 and the head 15.

An annular body 21 having an internal annular recess 23 is rotatably mounted on the stem in sealed relation to the stem. Sealing is provided by an annular flat packing ring or gasket 25 interposed between head 15 and one end of body 21, which may be referred to as its outer end (and which is its lower end as viewed in FIG. 2), and by a packing ring (an O-ring) 27 received in an annular groove 28 in the other end (the inner end) of body 21 surrounding and engaging the stem 11 immediately outwardly of the inner end of the screw thread 13. As shown, body 21 has an inwardly directed flat annular flange 29 at its outer end (its lower end as viewed in FIG. 2) engaging gasket 25. The circular opening 31 defined by this flange at the outer end of body 21 is of substantially larger diameter than stem 11. Gasket 25 may be made of copper, for example, and packing ring 27 may be made of oil-resistant packing material such as an oil-resistant synthetic rubber.

Surrounding the stem 11 within the annular body 21 and covering the radial ports 19 is an elastic sleeve 33 made of an oil-resistant elastic material such as an oil-resistant synthetic rubber. This sleeve, in unstretched condition, has an internal diameter somewhat less than the diameter of stem 11, and, as applied to the stem, is stretched so that it has a tight fit on the stem for normally sealing ports 19.

Surrounding the elastic sleeve 33 within the annular body 21 is a rigid cylindrical sleeve 35, which may be made of steel, for example. Sleeve 35 has an internal diameter larger than the external diameter of the elastic sleeve 33 as the latter is applied to stem 11 to allow for expansion of the elastic sleeve, and an external diameter somewhat less than the internal diameter of annular flange 29. The outer end of sleeve 35 fits into the circular opening 31 defined by flange 29, and sleeve 35 is thereby held in concentric relation with respect to stem 11 surrounding and spaced from elastic sleeve 33. The length of sleeve 35 is made such that its inner end is spaced from the inner side of recess 23 (its upper side as viewed in FIG. 2).

A nipple 37 extends radially outwardly from body 21, having its inner end secured in a radial hole in annular body 21 in communication with recess 23. A flexible drain hose 39 has one end fitted on the nipple and extends from body 21 in communication with recess 23. A flexible strap 41, made of synthetic rubber, for example, is provided on the hose adjacent its outer end, the strap having a plug 43 for plugging the outer end of the hose. The strap is retained on the hose by having a slit at 45 receiving the hose.

As shown in FIG. 1, fitting 9 of drain attachment 7 is threaded in the crankcase drain hole 5 to the point where packing ring 27 and gasket 25 are compressed for sealing the annular recess 23. The fitting is rotatable in body 21 for ease of assembly. The drain hose 39 is held in position extending up alongside the engine 1 by clips 47 provided on the engine. In use, the drain hose is taken out of the clips, plug 43 is removed, and a nozzle at the end of a suction hose connected to a drain pump (not shown) is inserted in the outer end of the drain hose. The latter may be swivelled to any convenient position for such connection of the suction hose. Then the drain pump is operated to draw oil from the crankcase. Elastic sleeve 33, which functions as a check valve, expands in response to suction of the pump to open radial ports 19 for flow of oil from the crankcase via passage 17 and ports 19 in fitting 7, annular recess 23 and drain hose 39. The oil flows radially outwardly through ports 19, thence upwardly between stem 11 of fitting 7 and the elastic sleeve 33, thence over the upper end of sleeve 35 into the portion of recess 23 surrounding sleeve 35, and thence out through the hose. Sleeve 35 functions as a retainer for elastic sleeve 33 so as to prevent sleeve 33 from unduly expanding on a fast suction stroke of the suction pump and blocking the inner end of the outlet nipple 37. As previously pointed out, elastic sleeve 33 normally seals the radial ports 19 and thereby prevents loss of oil from the crankcase.

While the drain attachment 7 is herein described as connected into a crankcase for draining oil from the crankcase, it will be understood that in general it may be connected to other types of receptacles for liquids to drain liquid therefrom.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A drain attachment comprising a fitting consisting of a cylindrical stem having an external screw thread at one end constituting its inner end for threading into a drain hole in a crankcase and a head at its other or outer end, said stem having an axial passage extending from its said inner end and terminating short of the outer end of the fitting and radial ports extending outward from the passage intermediate the inner end of the screw thread and the head, an annular body rotatably mounted on the stem, said body having an internal annular recess adapted for communication with the passage in the stem via said ports, packing interposed between the head and the outer end of the body and packing at the inner end of the body for sealing the recess, an elastic sleeve stretched on said stem normally to cover and seal the outer ends of said ports within said recess, and a drain hose extending from said body in communication with said recess.

2. A drain attachment as set forth in claim 1 wherein said body has an inwardly directed annular flange at its outer end engaging the packing interposed between the head and the outer end of the body, said flange defining an opening larger than said stem, and a rigid sleeve of larger internal diameter than the external diameter of said elastic sleeve surrounding the elastic sleeve in said recess and having its outer end received in said opening for holding said rigid sleeve in concentric relation with said stem.

3. A drain attachment as set forth in claim 2 wherein the packing at the inner end of the body comprises a ring received in an annular groove in the inner end of the body.

4. A drain attachment as set forth in claim 2 wherein the length of the rigid sleeve is such that the inner end of the rigid sleeve is spaced from the inner side of the recess to provide for flow around the inner end of the rigid sleeve to the recess.

5. A drain attachment as set forth in claim 1 wherein the hose carries a strap adjacent its outer end, with a plug on the strap for plugging the outer end of the hose.

6. A drain attachment comprising a fitting adapted for connection at one end into a receptacle to be drained, said fitting having a passage extending outwardly from said one end and terminating short of the other end of the fitting, said fitting having at least one radial port from said passage, an annular body rotatably mounted on said fitting in sealed relation to the fitting having an internal annular recess adapted for communication with the passage in the fitting via said port, a drain hose extending from said body in communication with said recess, and check valve means in said attachment adapted to open in the direction for outward flow through said hose and to close in the reverse direction, said check valve means comprising an elastic sleeve stretched on said fitting normally to cover and seal the outer end of the radial port and adapted to expand for opening the port, and a retainer in said recess for the elastic sleeve adapted to prevent expansion of said elastic sleeve to a point where it would block flow out of the body.

7. A drain attachment as set forth in claim 6 wherein said retainer comprises a rigid sleeve surrounding the elastic sleeve in concentric relation with respect to the fitting.

References Cited in the file of this patent

UNITED STATES PATENTS

| 923,545 | Madison | June 1, 1909 |
| 1,957,736 | Strehler | May 8, 1934 |
| 2,281,142 | Davis | Apr. 24, 1942 |
| 2,715,980 | Frick | Aug. 23, 1955 |
| 3,031,166 | Fischer | Apr. 24, 1962 |